Sept. 11, 1956     L. G. NAUMANN     2,762,461
AUTOMATIC ADJUSTING MECHANISM FOR DISC BRAKES
Filed April 13, 1951     2 Sheets-Sheet 1
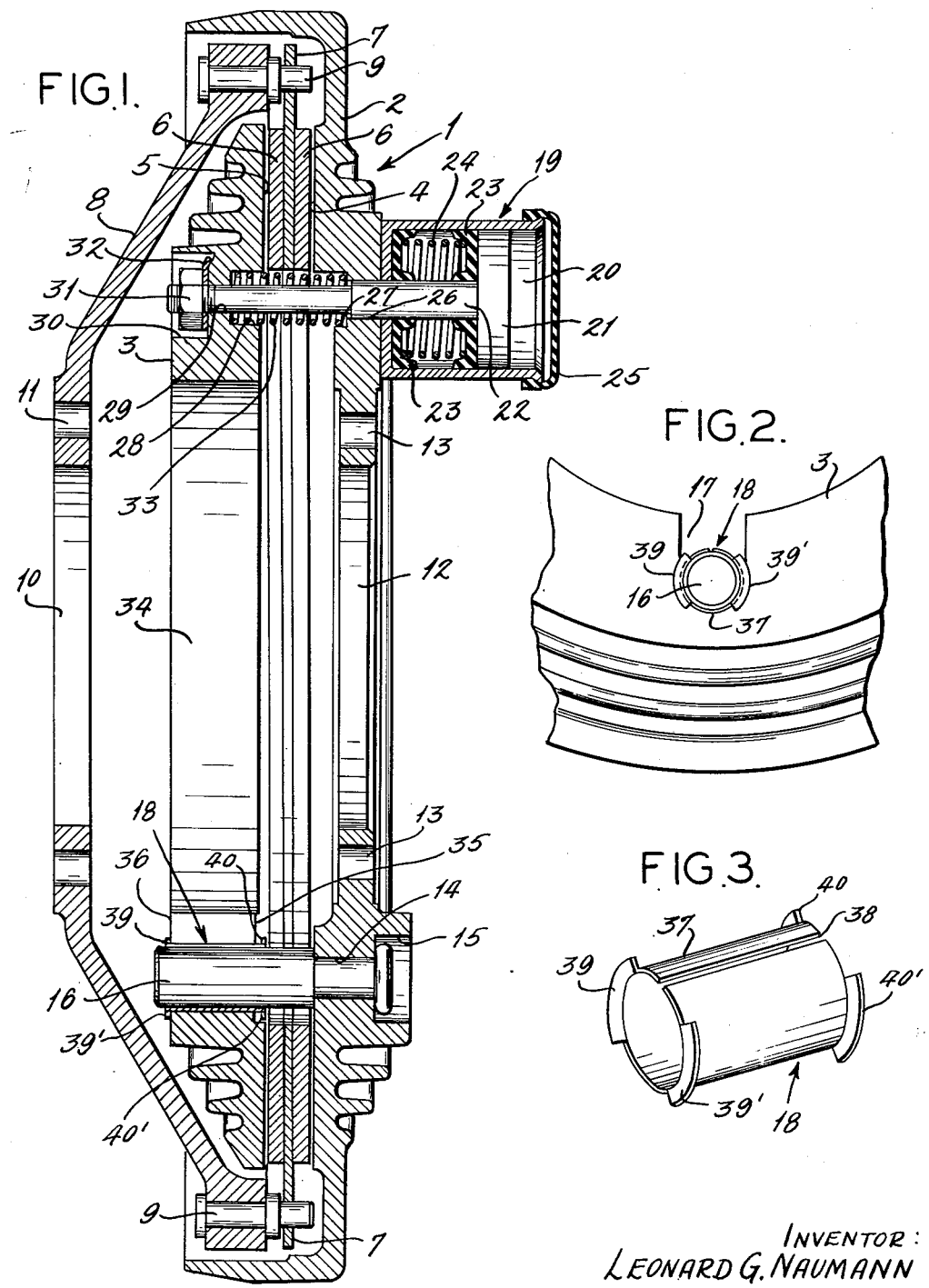
INVENTOR:
LEONARD G. NAUMANN
By Carr&Carr&Gravely
ATTORNEYS

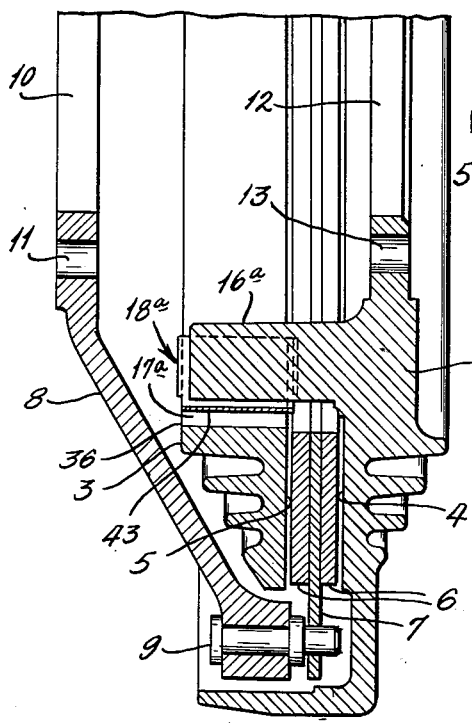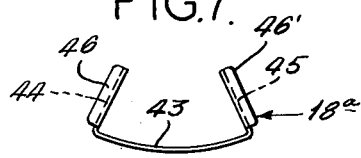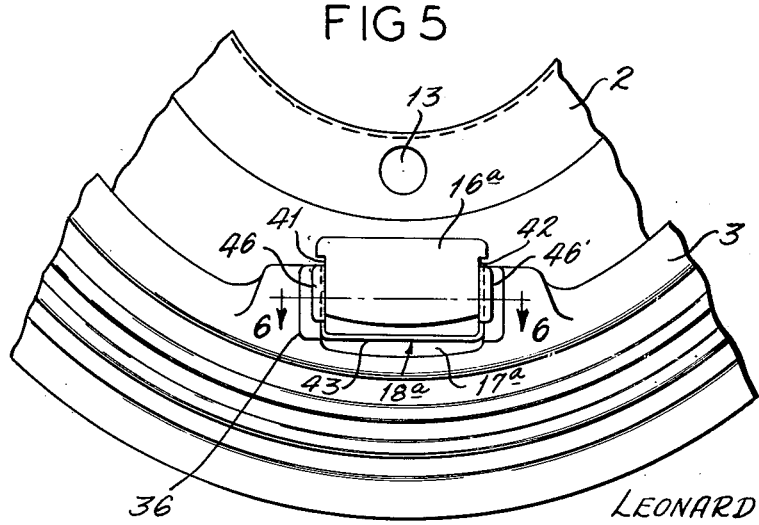

United States Patent Office 2,762,461
Patented Sept. 11, 1956

2,762,461

AUTOMATIC ADJUSTING MECHANISM FOR DISC BRAKES

Leonard George Naumann, Maplewood, Mo., assignor to Wagner Electric Corporation, St. Louis, Mo., a corporation of Delaware Application April 13, 1951, Serial No. 220,836

9 Claims. (Cl. 188—72)

This invention relates to brakes and is more particularly adapted to an adjusting mechanism for disc brakes to maintain a specified clearance in the "off" position between the friction members and the member or members engageable therewith.

The design of brake assemblies and brake systems as a whole involves many problems, such as fluid displacement, which is a governing factor in determining the size of the pistons to be used in the master cylinders and wheel cylinders. In calculating the required fluid displacement for a particular system a specified travel of the members engageable with the friction members must be selected realizing, of course, that increased pedal travel can compensate for an increased fluid displacement which will result as wear of the friction members occurs. However, the pedal travel also has its limitations and if the wear of the friction members becomes excessive, then it is quite possible that the brake system will become inoperative unless the necessary wear compensations are made. Wear compensation is accomplished by re-locating the "off" position of the members engageable with the friction members to shorten or restore their original travel which, in turn, decreases the required fluid displacement to the original value. The present invention eliminates the necessity of manual adjustments and maintains a given fluid displacement. Furthermore, by maintaining a given fluid displacement the pedal travel required in making a brake application will also be held to a constant value.

The primary object of the invention is to provide an improved and simplified adjusting mechanism for disc brakes which is entirely automatic in operation.

Another object of the invention is to provide an automatic adjusting mechanism which is primarily dependent upon the frictional forces for its unique operation.

This invention consists in the provision of a plurality of resilient adjusting members operable in conjunction with disc brake assemblies for maintaining a specified clearance between the brake rings and their cooperating friction members when the brake assemblies are in inoperative position, the resilient members being so constructed as to permit the frictional forces associated therewith to restrict the movement of said members in one direction, the unidirectional movement occurring only when wear of the friction members permits.

In the drawings:

Fig. 1 is a vertical cross-sectional view of a disc brake assembly incorporating the novel features of the invention, Fig. 2 is an enlarged fragmentary front elevational view of the adjusting mechanism shown in the lower part of Fig. 1, the brake wheel being removed from the disc brake assembly, Fig. 3 is a perspective view of the adjusting mechanism, Fig. 4 is a fragmentary vertical cross-sectional view of the lower portion of a disc brake assembly showing a modified form of adjusting mechanism, Fig. 5 is a fragmentary front elevational view of the modified adjusting mechanism shown in Fig. 4, the brake wheel being removed therefrom, Fig. 6 is a fragmentary horizontal sectional view taken along the line 6—6 of Fig. 5; and Fig. 7 is a front elevational view of the modified form of the adjusting mechanism shown in its pre-deflected position prior to installation on the disc brake assembly.

Referring to Fig. 1 of the drawings, the disc brake assembly 1 comprises a fixed inner ring 2 and an axially movable outer ring 3, the rings having faces 4 and 5 thereon for engagement with the adjacent friction members 6. The friction members 6 are supported on a slidable disc plate 7 attached to the brake wheel 8 by studs 9. The brake wheel is provided with a large aperture 10 for receiving the axle of the vehicle upon which it is mounted, and with small apertures 11 for receiving the necessary fastening means for attaching the wheel assembly of the vehicle to the brake wheel.

The fixed inner ring 2 is also provided with a large aperture 12 for receiving the axle of the vehicle and small apertures 13 for receiving the fastening means for securing ring 2 to the axle flange or to some other comparable member on the vehicle. The ring 2 is also provided with a bore 14 and counterbores 15 for receiving and supporting a cylindrical stud 16 permanently fixed thereto. The left end of stud 16 is receivable in a slot 17 provided in the outer ring 3, permitting movement of the outer ring relative to said stud 16. Frictionally engaging the cylindrical stud 16 is an adjusting mechanism 18 to be more fully described hereinafter.

Diametrically opposite stud 16 is a wheel cylinder 19 suitably secured to the right side of the inner ring 2. The cylinder 19 is provided with a bore 20 in which a piston 21 is slidably mounted. A piston rod 22 extends to the left of piston 21 through rings 2 and 3. Surrounding the piston rod 22 are cups 23, one of which prevents the escape of pressure fluid between the periphery of piston 21 and the inner wall of cylinder 19; the other cup prevents the escape of fluid between the outer surface of piston rod 22 and the bore which received the piston rod within the end of cylinder 19. The cups 23 are held in spaced relationship by spring 24, thus permitting the pressure fluid to flow through the inlet (not shown) in the cylinder for entrance into the space between said cups. The open end of cylinder 19 is closed by a boot 25 for preventing ingress of foreign material and its possible interference with the working parts within the cylinder. The left end of piston rod 22 of piston 21 extends through a bore 26 and counterbore 27 in the inner ring 2, the extreme left end thereof extending through bore 29 and counterbore 30 in the outer ring 3. To secure the left end of piston rod 22 to the outer ring 3 a nut 31 is threaded on the left end thereof. Relative movement between the parts, due to vibrations, is prevented by a lock washer 32. Surrounding the piston rod 22 and interposed between inner ring 2 and outer ring 3, is a return spring 33 which serves to break the contact between faces 4 and 5 on said rings and the adjacent friction members 6 after a braking application has been completed. The spring 33 is arranged to abut the ends of counterbores 27 and 28 in rings 2 and 3 respectively. The outer ring 3 is provided with a large aperture 34 concentric with aperture 10 in the brake wheel 8 and aperture 12 in the inner ring 2 which also receives the axle of the vehicle upon which the brake assembly 1 is mounted. The axially movable outer ring 3 has a machined outer face 36 and a machined surface 35 on the inner face about the opening 17 adjacent to the adjusting mechanism 18, the distance between the face 36 and the surface 35 being predetermined to provide for a fixed amount of movement of the ring 3 relative to the adjusting mechanism, as will be described more fully hereinafter.

The adjusting mechanism 18 (Fig. 3) is of substantially cylindrical shape and formed of a metal having resilient properties, such as spring steel. Although only one adjusting mechanism is shown, at least three uniformly spaced mechanisms are used with each brake assembly. The adjusting mechanism consists of a body 37 axially slit, as at 38, thus retaining its resiliency either when expanded or contracted by force. Formed on each side of the body 37 are tabs 39 and 39' and 40 and 40' respectively, the tab 39 being diametrically opposite tab 39', which is the same relationship as exists between tabs 40 and 40'. The distance between tabs 39 and 40 is of a predetermined value and equal to the distance between tabs 39' and 40'. Thus, as the adjusting mechanism 18 is placed over the fixed cylindrical stud 16 (Fig. 1), it is necessarily expanded and once upon the stud 16, a frictional force will exist between the inner surface of the cylindrical adjusting mechanism and the outer cylindrical surface of the fixed stud 16. Consequently, an appreciable force will be required to move the adjusting mechanism relative to the fixed stud 16. It should be noted, however, that before the adjusting mechanism can be assembled on stud 16, it must be slid in position at substantially the base of the slot 17 (Fig. 2) in the outer ring 3 with the machined faces 35 and 36 (Fig. 1) of the outer ring placed in the indicated relationship. Thus, as shown in Fig. 1, when the ring 3 is in the released position there is a predetermined space between face 35 of ring 3 and the tabs 40 and 40' of the adjusting mechanism which determines the amount of movement of the ring 3 between the inoperative and the operative positions. This spacing is a summation of the distances between face 4 of the inner ring 2 and its adjacent friction member 6, and between face 5 of the outer ring 3 and its adjacent friction member 6 and is the distance the ring has to be moved from the inoperative position to cause the friction members to be compressed between the faces 4 and 5 of the inner and the outer rings 2 and 3, respectively. It should also be noted that the return spring 33, which moves the outer ring 3 to its released position, does not possess sufficient strength to slide the adjusting mechanism 18 along the cylindrical surface of the fixed stud 16 in the direction away from the inner ring 2. Consequently, once the adjusting mechanism has been assembled as a part of the disc brake assembly, any movement of the adjusting mechanism 18 on the supporting stud 16 is in the direction of the inner ring 2 and results from the force developed by the fluid pressure acting within the wheel cylinder 19.

The principle of operation and unique novelty of the adjusting mechanism 18 can best be understood by explaining the operation of the disc brake assembly as follows: Assuming that the vehicle upon which the disc brake assembly is mounted, is moving along at a constant speed, a brake application is made by forcing pressure fluid into the wheel cylinder 19 to the left of piston 21. As previously pointed out, the inner ring 2 is fixed to the axle housing and, consequently, is not capable of either axial or rotary movement and the force thus created on the left side of piston 21 can only act to pull the outer ring 3 toward the inner ring 2. As this movement takes place the face 5 of the outer ring 3 makes contact with its adjacent friction member 6, a subsequent rightward movement thereof causing an axial movement of the disc plate 7 to bring about a frictional engagement between the face 4 of the inner ring 2 and its adjacent friction member 6. Thus, to make a braking application it is apparent that the outer ring 3 must travel a distance equal to the distance between its face 5 and the adjacent friction member 6 plus the distance between face 4 of the inner ring 2 and its adjacent friction member 6, which distance is equal to the spacing previously provided between the face 35 of outer ring 3 and the tabs 40 and 40' of the adjusting mechanism 18. Thus under the conditions above described, there will be no movement of the adjusting mechanism relative to the supporting stud 16 unless the travel of outer ring 3 is to exceed the predetermined spacing between face 35 and the adjacent tabs 40 and 40'. Therefore, assuming that the friction members 6 have worn sufficiently to require this additional movement, it then becomes necessary for ring 3, which normally moves relative to the adjusting mechanism 18, to also move said adjusting mechanism rightwardly upon making contact between face 35 and the tabs 40 and 40', the rightward movement of the adjusting mechanism 18 being equal to the required wear compensation.

As the operator of the vehicle upon which the disc brake assembly 1 is mounted, has completed the braking application, the fluid pressure acting within the cylinder 19 is released for permitting the return spring 33 to move the outer ring 3 axially away from the inner ring 2, allowing the return of friction members 6 to their original positions with respect to the disc brake assembly subsequent to which the ring 3 breaks the contact between its face 5 and the adjacent friction member 6. The return movement of ring 3 is stopped when face 36 of ring 3 contacts the tabs 39 and 39' on the adjusting mechanism 18 since, as previously pointed out, the return spring 33 is not of sufficient strength to move the adjusting mechanism 18 relative to its supporting stud 16. Therefore, the return movement of ring 3 terminates whenever the face 36 makes contact with tabs 39 and 39' of the adjusting mechanism.

Figs. 4 through 7 illustrate a modified adjusting mechanism which is to be used in connection with the rectangular shaped projection 16a of the inner ring 2 instead of the cylindrical stud 16 (Fig. 1) described above. The modified adjusting mechanism 18a (Figs. 5 and 6) is comprised of a base 43 which is rectangular in cross section having arms 44 and 45 (Figs. 6 and 7) forming the ends at right angles to the base. The arms 44 and 45 are provided with tabs 46 and 47 and 46' and 47' respectively, said tabs being formed at right angles to their respective arms. The distances between tabs 46 and 47 and tabs 46' and 47' are equal and of a predetermined value so as to provide a predetermined spacing between face 5 of outer ring 3 and the tabs 47 and 47' when the opposite face 36 of ring 3 is in contact with tabs 46 and 46'. This predetermined spacing represents the sum of the distances provided between face 4 of the inner ring 2 and its adjacent friction member 6, and between face 5 of the outer ring 3 and its adjacent friction member 6.

As in the case of the cylindrical-shaped adjusting mechanism described above, the modified adjusting mechanism 18a also possesses resilient properties and normally assumes the shape shown in Fig. 7 and that shown in Figs. 4 through 6 when installed. Thus, when the adjusting mechanism is deflected to be placed upon the rectangular projection 16a (Fig. 6) of the inner ring 2, a frictional force will exist between arms 44 and 45 and the adjacent faces 41 and 42, respectively, on extension 16a requiring a force greater than that possessed by the return spring 33 (Fig. 1) to move the adjusting mechanism 18a (Figs. 4 and 6) relative to the extension 16a. Therefore, in making a braking application in the manner above described, the outer ring 3 (Fig. 4) is moved axially toward the inner ring 2, making contact between the face 5 of the outer ring 3 and the adjacent friction member 6, further movement of ring 3 forcing the friction member 6 adjacent the face 4 of inner ring 2 in contact therewith, the construction of the disc plate 7 permitting slight axial movement of the friction members 6 relative to the inner ring 2. Assuming that no wear has taken place previously, it will not be possible for the outer ring 3 to move the adjusting mechanism 18a rightwardly since faces 4 and 5 of rings 2 and 3 engage the adjacent friction members 6 as face 5 of the outer ring 3 makes contact with tabs 47 and 47' on the adjusting mechanism 18a. However, as wear of the friction members 6 occurs it is obvious that in order to maintain the frictional contacts between the faces of the brake rings and their adjacent friction members, it will be necessary for the outer ring 3 to move further toward its cooperating inner ring 2. Thus the additional movement of the outer ring 3 being required, it becomes necessary for the fluid pressure actuating the brake assembly, to supply the necessary force to the outer ring 3 for moving the modified adjusting mechanism 18a relative to the supporting extension 16a a distance equal to the lining wear for which it is being compensated. However, after the braking application has been completed, the outer ring 3 will not be moved back to its original position during the return movement but will move relative to the adjusting mechanism 18a because it is terminated when the opposite face 36 thereof contacts tabs 46 and 46', leaving a predetermined spacing between face 5 of the outer ring 3 and tabs 47 and 47'. As stated above, this spacing is equal to the sum of the spaces between face 5 of ring 2 and its adjacent friction member 6 and face 4 of the inner ring 2 and its adjacent friction member 6.

In the present instance, the respective parts of the disc brake assembly, including the novel adjusting mechanisms, are assembled in the manner and relation indicated in the drawings with complete disregard to the specific location of the adjusting mechanisms. When the various parts which make up the disc brake are first assembled, it is entirely possible that the spacings will not be on the proper side of the brake rings. However, by making a single application of the brakes, the adjusting mechanisms will be located in their initial positions and thereafter the "off" position clearance between the brake rings and the adjacent friction member will be automatically maintained, subsequent movement or re-location of the adjusting mechanisms being in accordance with the subsequent wear of the friction members.

What I claim is:

1. A disc brake assembly comprising a fixed disc, a disc movable toward and away from said fixed disc, a rotatable member disposed between said discs, means for moving said movable disc toward and away from said fixed disc, means projecting from said fixed disc and extending through said movable disc; and means frictionally mounted on said projecting means and engaged by said movable disc for adjusting the position of said movable disc relative to said fixed disc.

2. A disc brake assembly comprising a fixed disc, a pin projecting from said disc, a disc receiving said pin and movable toward and away from said fixed disc, a fluid motor for moving said movable disc toward said fixed disc, a spring for moving said movable disc away from said fixed disc, a rotatable friction member disposed between said discs, a resilient member mounted on the pin in frictional engagement therewith; and flanges on each end of said resilient member for engagement by said movable disc, said fluid motor causing the movement of said resilient member relative to said pin by the engagement of the flanges on one end of said resilient member by said movable disc after a predetermined wear of said friction member, the flanges on the other end of said resilient member limiting the return movement of said movable disc by said spring.

3. A disc brake assembly comprising a fixed disc, a pin projecting from said fixed disc, a disc movable toward and away from the fixed disc and receiving said pin, a fluid motor for moving said movable disc toward said fixed disc, a spring for moving said movable disc away from said fixed disc, a rotatable friction member disposed between said discs, a sleeve frictionally engaging said pin, flanges on one end of said sleeve for engagement by said movable disc, said fluid motor moving said sleeve along said pin after a predetermined wear of said friction member; and flanges on the other end of said sleeve for limiting the return movement of said movable disc.

4. A disc brake assembly comprising a fixed disc, a rectangular pin projecting from said fixed disc, a slidable disc having a slot therein in which said pin is received, a fluid motor for moving said slidable disc toward said fixed disc, a spring for moving said slidable disc away from said fixed disc, a rotatable friction member disposed between said discs, a U-member frictionally engaging said pin, flanges on one end of said U-member for engagement by said slidable disc, said fluid motor moving said U-member along said pin by the engagement of said flanges by said slidable disc after a predetermined wear of said friction member; and flanges on the other end of said U-member for limiting the return movement of said slidable disc.

5. A disc brake assembly comprising a first disc, a second disc, said discs being axially movable relative to each other, a rotatable member disposed between said discs, means for moving at least one of said discs toward and away from the other disc, means projecting from said first disc and extending beyond the second disc; and adjustable means frictionally engaging said projecting means and movable by said second disc for adjustably spacing said discs relative to each other.

6. A disc brake assembly comprising a first disc, a pin projecting from said disc, a second disc receiving said pin, said second disc being movable toward and away from said first disc, a fluid motor for moving said second disc toward said first disc, a spring for moving said second disc away from said first disc, a rotatable friction member disposed between said discs, a resilient member frictionally engaging said pin; and a flange adjacent each end of said resilient member for engagement by one of said discs, said fluid motor causing said resilient member to move along said pin by moving the second disc into engagement with the flange on one end of said member after a predetermined wear of said friction member, the flange on the other end of said resilient member limiting the return movement of said second disc.

7. A disc brake assembly, comprising an abutment member; a member movable toward and away from the abutment member; a rotatable member disposed between the abutment member and the movable member; means for moving the movable member toward and away from the abutment member; means fixed relative to the abutment member projecting therefrom toward the movable member; and means adjustably mounted on the projecting means and containing means for engaging the movable member limiting the movement thereof away from the abutment member.

8. A disc brake assembly, comprising an abutment member; a member movable toward and away from the abutment member; a rotatable member disposed between the abutment member and the movable member; means for moving the movable member toward and away from the abutment member; means fixed relative to the abutment member projecting therefrom toward the movable member; and means adjustably mounted on the projecting means and containing means for engaging the movable member, said adjustable means being movable toward the abutment member by the movable member but limiting the movement of the movable member away from the abutment member.

9. A disc brake assembly, comprising an abutment member; a member movable toward and away from the abutment member; a rotatable member disposed between the movable member and the abutment member; first force producing means for moving the movable member toward the abutment member; second force producing means for moving the movable member away from the abutment member; a projecting member fixed relative to the abutment member and extending therefrom toward the movable member; and means adjustably mounted on the projecting member and containing means engageable with the movable member, said adjustable means being movable toward the abutment member and limiting the movement of the movable member away from the abutment member; the force exerted by the first force producing means being greater than that required to move the movable member and the adjustable member, and the force exerted by the second force producing means being less than that required to move both the movable member and the adjustable member.

References Cited in the file of this patent

UNITED STATES PATENTS

| | | |
|---|---|---|
| 2,384,297 | Goepfrich | Sept. 4, 1945 |
| 2,551,251 | Du Bois | May 1, 1951 |
| 2,551,252 | Du Bois | May 1, 1951 |
| 2,568,858 | Kovac | Sept. 25, 1951 |
| 2,672,223 | Butler | Mar. 16, 1954 |